No. 12,175. REISSUED NOV. 24, 1903.

W. McCONWAY & J. KELSO.

CAR COUPLING.

APPLICATION FILED JUNE 15, 1903.

2 SHEETS—SHEET 1.

Witnesses:
F. E. Gaither
Herbert Bradley

Inventors:
William McConway
Joseph Kelso
by Christy & Christy Attys.

THE NORRIS PETERS CO., WASHINGTON, D. C.

No. 12,175. REISSUED NOV. 24, 1903.

W. McCONWAY & J. KELSO.

CAR COUPLING.

APPLICATION FILED JUNE 15, 1903.

2 SHEETS—SHEET 2.

Witnesses:
F. E. Gaither
Herbert Bradley

Inventors:
William McConway
Joseph Kelso
by Christy & Christy, Attys.

THE NORRIS PETERS CO., WASHINGTON, D. C.

No. 12,175. Reissued November 24, 1903.

UNITED STATES PATENT OFFICE.

WILLIAM McCONWAY AND JOSEPH KELSO, OF PITTSBURG, PENNSYLVANIA, ASSIGNORS TO THE McCONWAY & TORLEY COMPANY, OF PITTSBURG, PENNSYLVANIA, A CORPORATION OF PENNSYLVANIA.

CAR-COUPLING.

SPECIFICATION forming part of Reissued Letters Patent No. 12,175, dated November 24, 1903.

Original No. 661,153, dated November 6, 1900. Application for reissue filed June 15, 1903. Serial No. 161,484.

*To all whom it may concern:*

Be it known that we, WILLIAM McCONWAY and JOSEPH KELSO, citizens of the United States, residing at Pittsburg, in the county of Allegheny and State of Pennsylvania, have invented or discovered certain new and useful Improvements in Car-Couplers, of which improvements the following is a specification.

The invention described herein relates to certain improvements in car-couplers of the Janney or swinging-hook type; and the invention has for one object a construction whereby the locking-block and the block-lifting device are so interlocked one with the other by the shifting of the locking-block to unlocking position as to mutually sustain each other; and it is a further object of the invention to so arrange such parts that the interlocking connection will be maintained during the opening of the knuckle, but will be broken when the knuckle is closed.

The invention is hereinafter more fully described and claimed.

Figure 1:
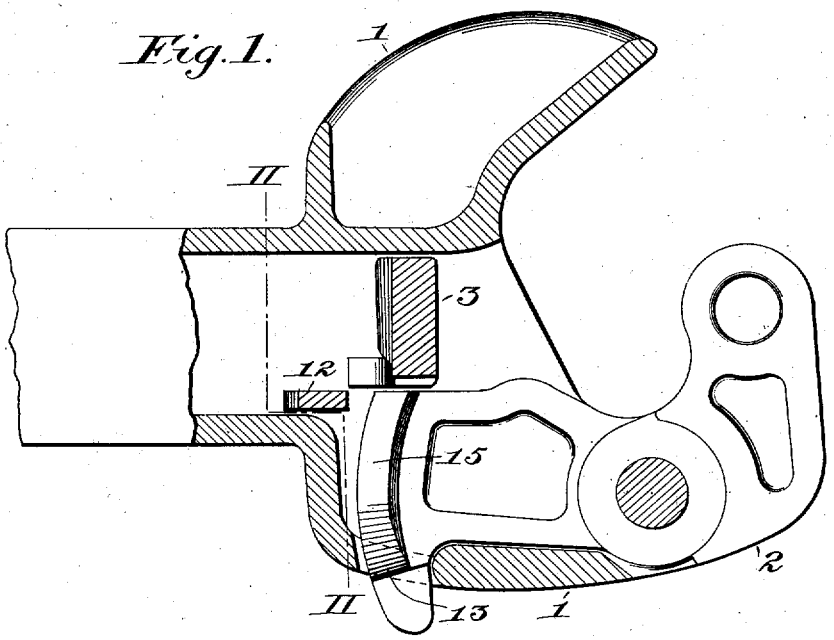
Figure 2:
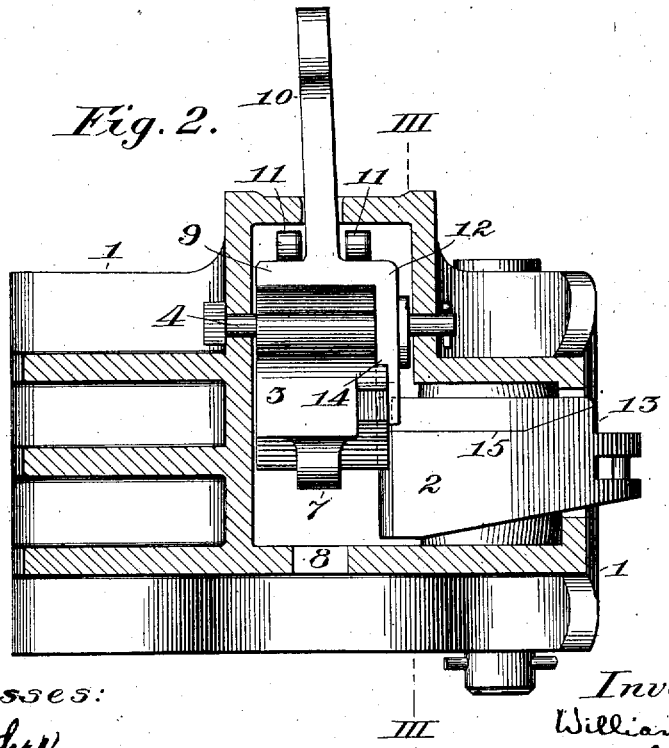
Figure 3:
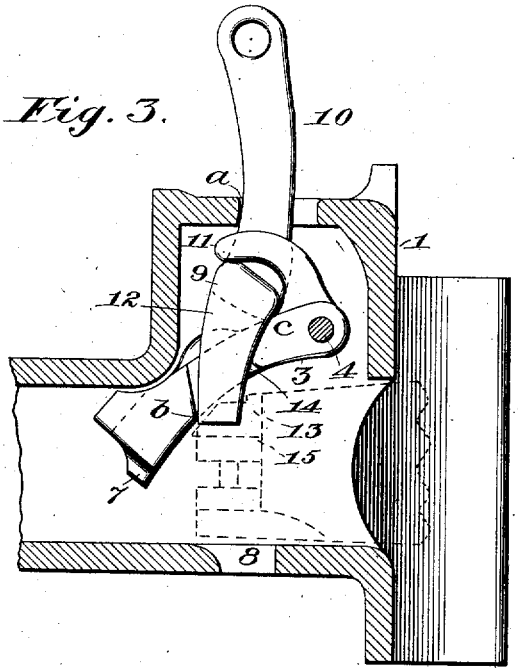
Figure 4:
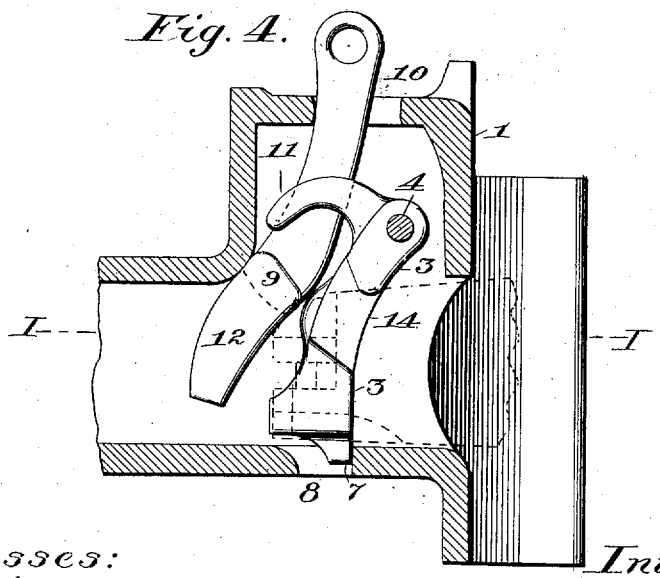

In the accompanying drawings, forming a part of this specification, Figure 1 is a sectional plan view showing the knuckle closed and in locked position, the plane of section being indicated by the line I I, Fig. 4. Fig. 2 is a sectional elevation showing the knuckle closed and the locking-block raised and locked in such position, the plane of section being indicated by the line II II, Fig. 1. Fig. 3 is a sectional elevation on a plane indicated by the line III III, Fig. 2, the knuckle being open and the locking-block being locked in raised position; and Fig. 4 is a view similar to Fig. 3, showing the locking-block released and in operative position.

In the practice of our invention the coupler is preferably constructed, so far as regards the head 1, knuckle 2, and locking-block 3, substantially as described and shown in application, Serial No. 6,236, filed February 23, 1900. As described in said application, the locking-block 3 is provided on its rear side and preferably near its pivotal point with fingers 11, which are adapted to engage a head 9, provided with a stem 10, extending up through the top of the coupler-head, so that by the raising of this head the locking-block may be swung to the rearward and out of the path of movement of the tail of the knuckle. Any suitable means may be employed for raising the head 9; but it is preferred to employ the lifting device shown in the application above referred to, operative from the side of the car.

In order to hold the locking-block in its raised position, the head 9 is provided at one end with an arm 12, projecting down alongside of the locking-block, which is provided in the edge adjacent to the arm 12 with a notch 14. By reference to Figs. 3 and 4 it will be seen that in raising the head 9, and thereby the block 3, the arm 12 will move forward alongside of the block and come into alinement with the notch 14 in the edge thereof, when by a lateral movement of the arm it will enter the notch. If now the stem 10 be released from the lifting device, the head, with its arm and the block, will be interlocked, so as to remain in the elevated position.

It will be seen by reference to Fig. 3 that as the arm 12 enters the notch in the side of the block 3 and the stem 10 is released the block and its lifter will settle down and the sides of the notch will bear at the points *b* and *c* on opposite sides of the arm 12. These points of bearing being out of line with each other, the weight of the locking-block will tend to shift the upper portion of the lifter—*i. e.*, the stem 10—to the left. Such movement is prevented by the bearing of the stem 10 at the point *a* on the coupler-head. In other words, the lifter, consisting of the head 9, stem 10, and arm 12, becomes, when the arm engages the notch in the locking-block, a locking bar or lever with its fulcrum at *c*, the load at *b*, and the resistance-power at *a*. As regards the broader features of my improved means for holding the locking-block in inoperative position the invention is not limited to any specific form or construction or arrangement of the locking-block or the supporting devices.

As will be seen by reference to Fig. 3, the arm 12 is so constructed as to to project into the path of movement of a shoulder 13 on the tail of the knuckle when the locking-block is raised. As will be seen by reference to Fig.

2, this shoulder 13 is so inclined that when the knuckle is opened the arm will simply ride up on the incline of the shoulder, but will not be dislodged from engagement with the locking-block; but such disengagement will be effected by the closing movement of the knuckle, when the abrupt portion of the shoulder 13 will strike against the lower end of the arm and dislodge it from the notch in the locking-block, thereby permitting the latter to fall to the operative position.

In order to prevent the dropping of the locking-block to locking position in case it should become disengaged from the arm 12 accidentally while the knuckle is in closed position, the tail of the knuckle is provided with a ledge 15, over which the lower end of the arm 12 will be moved when the block 3 is raised and locked, so that in case of a disengagement of the arm from the block the arm will drop until its end rests upon this ledge, whereby it will be supported, and with it the locking-block, in unlocking position.

In order to insure the necessary lateral movement of the arm 12 to cause it to engage the notch in the locking-block, the stem 10 is given a pitch or inclination, as shown in Fig. 2, such that when an upward pull is exerted by the lifting mechanism above referred to the arm 12 will be given a lateral movement into the notch in the locking-block as soon as it comes into line thereof.

We claim as our invention—

1. In a car-coupler, the combination of a swinging hook provided with a tailpiece, a gravity-lock arranged to move into the path of movement of the tail of the knuckle, and a locking-bar arranged to be shifted on the unlocking movement of the locking-block so as to have a bearing at two points in different horizontal planes on the locking-block and to have a third bearing on a stationary point or abutment outside of the locking-block, substantially as set forth.

2. In a car-coupler, the combination of a swinging hook provided with a tailpiece, a gravity-lock adapted to move into the path of movement of the tail of the knuckle and having two shoulders or bearing-points out of line with each other, a locking-bar arranged to be shifted on the unlocking movement of the locking-bar between the shoulders or bearing-points on the locking-block, and a stationary bearing point or abutment for the locking-bar outside of the locking-block, substantially as set forth.

3. In a car-coupler, the combination of a swinging hook provided with a tailpiece, a locking-block adapted to move into and out of the path of movement of the tail of the knuckle, and a locking-bar, the locking block and bar being constructed to interlock when the block is in unlocked position and mutually support one another in unlocked position, substantially as set forth.

4. In a car-coupler, the combination of a swinging hook provided with a tailpiece, and a locking mechanism for the hook consisting of members constructed to interlock and mutually support one another in unlocked position, substantially as set forth.

5. In a car-coupler, the combination of a swinging hook provided with a tailpiece, a pivoted locking-block provided with a notch, a locking-bar adapted to enter said notch by a lateral movement when the block is in unlocked position and thereby hold the block in unlocked position, and means for supporting the bar in raised position, substantially as set forth.

6. In a car-coupler, the combination of a swinging hook provided with a tailpiece, a pivotally-mounted locking-block movable into and out of the path of movement of the tail of the knuckle and provided with a notch, and a lifter engaging said block to raise it to unlocked position and provided with an arm adapted to move laterally into the notch in the block and thereby hold the latter in unlocked position, substantially as set forth.

7. In a car-coupler the combination of a swinging hook or knuckle, a gravity-lock arranged to move into the path of movement of the tail of the knuckle, a locking-bar interlocking with the gravity-lock in unlocking or inoperative position, and means operative on the closing movement of the knuckle to break the lock and thereby permit the gravity-lock to move to locking or operative position, substantially as set forth.

8. In a car-coupler, the combination of a swinging hook or knuckle, a gravity-lock arranged to move in the path of movement of the tail of the knuckle, a locking-bar adapted to engage and hold the gravity-lock in unlocking or inoperative position, and a shoulder on the tail of the knuckle arranged to engage and shift the locking-bar on the closing movement of the knuckle independent of any opening movement of the knuckle, substantially as set forth.

9. A swinging hook or knuckle of the Master Car-Builders' type constructed to permit when in closed position of the shifting and locking of the locking block or pin in raised or inoperative position and having a shoulder so arranged on its tail portion that in the closing movement of the knuckle it will engage and shift one of two members of an interlocking gravity-lock and locking-bar out of its engagement with the other member and thereby release the gravity-lock for the knuckle, substantially as set forth.

In testimony whereof we have hereunto set our hands.

WILLIAM McCONWAY.
JOSEPH KELSO.

Witnesses:
J. W. HARTLEY,
F. D. ECKER.